United States Patent [19]

Bell

[11] Patent Number: 5,562,001

[45] Date of Patent: Oct. 8, 1996

[54] TOOL FOR USE IN ALIGNING A VEHICLE DOOR

[76] Inventor: James E. Bell, Box 3120 Gospel Peace Rd., Hopkinsville, Ky. 42240

[21] Appl. No.: 349,954

[22] Filed: Dec. 6, 1994

[51] Int. Cl.$^6$ ........................................... B21J 13/08
[52] U.S. Cl. ........................ 72/458; 72/479; 72/705
[58] Field of Search .......................... 72/705, 479, 458

[56] References Cited

U.S. PATENT DOCUMENTS

| | | | |
|---|---|---|---|
| 3,965,720 | 6/1976 | Goodwin et al. | 72/458 |
| 4,399,683 | 8/1983 | Hunter | 72/458 |
| 4,619,132 | 10/1986 | McBee | 72/458 |
| 4,744,135 | 5/1988 | Roels | 29/267 |
| 4,930,337 | 6/1990 | Schaap | 72/458 |
| 4,934,174 | 6/1990 | Gronlund et al. | 72/458 |
| 5,331,837 | 6/1994 | Stuhlmacher, II | 72/705 |

OTHER PUBLICATIONS

MAC Tools Catolog of 1992, p. 388, bottom left, DHA7554 Door Hinge Aligner.
STECK Product Sheet showing part No. 21840 Door Aligning Bar.

Primary Examiner—Daniel C. Crane
Assistant Examiner—Ed Tolan
Attorney, Agent, or Firm—Middleton & Reutlinger; James C. Eaves, Jr.

[57] ABSTRACT

A tool for use in aligning a vehicle door. A vehicle typically has a door lock assembly which receives a lock pin on the door frame, or similar article, to secure the vehicle door in a closed position. The tool of the present invention has a comparable lock pin toward one end which can be "locked" into the vehicle lock assembly and, at an opposed end, a portion for engaging the vehicle door frame lock pin. The lock pin engaging portion is structured so that, at least, the door and the door frame are horizontally fixed in a desired ajar relationship. This frees both hands of the tool user to make the desired door adjustment. The tool of the preferred embodiment is used with a standard breaker bar, with extension if necessary.

12 Claims, 3 Drawing Sheets

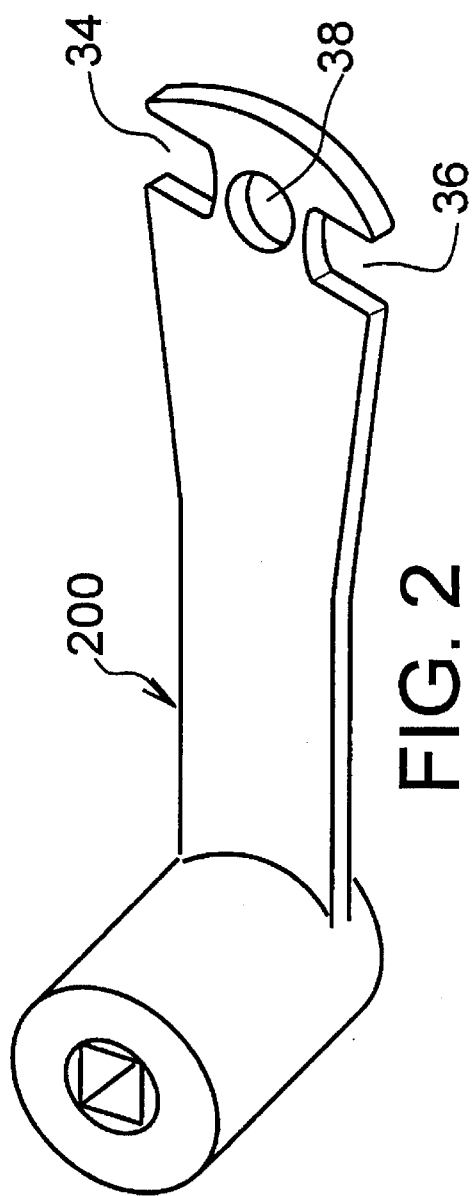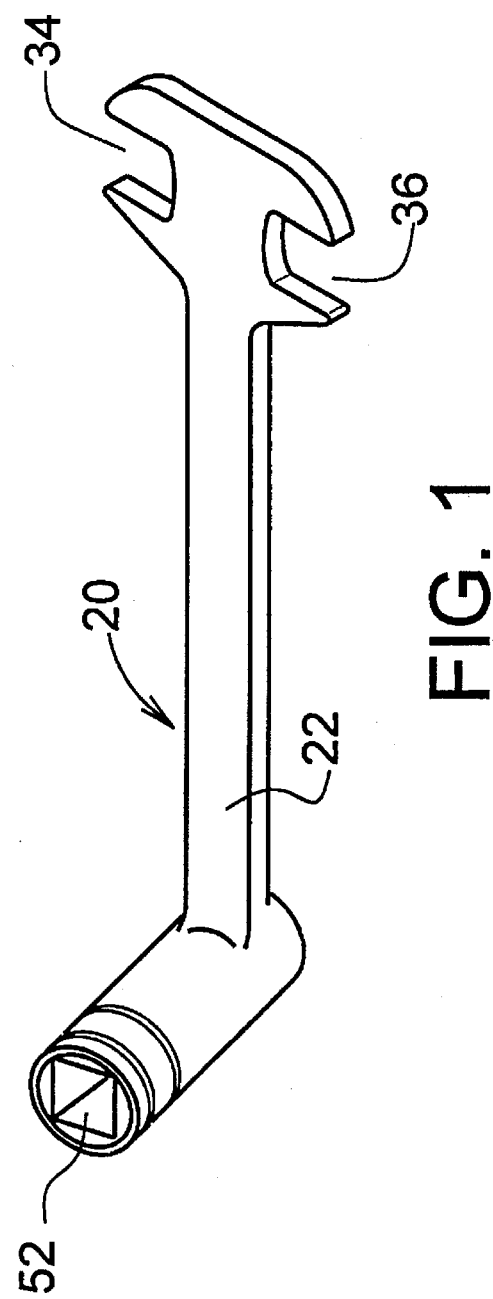

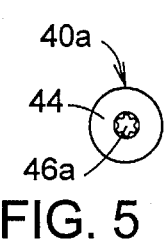 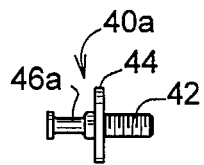 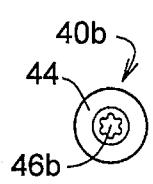 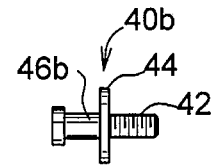
FIG. 5   FIG. 6   FIG. 7   FIG. 8
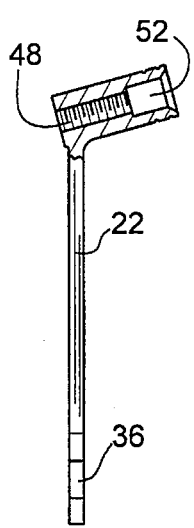 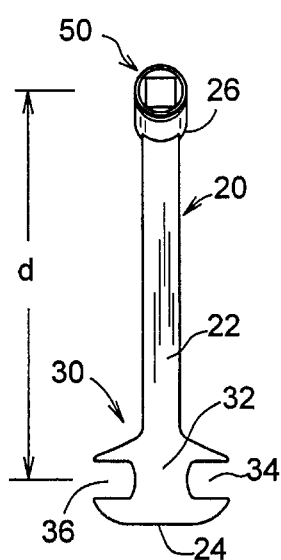 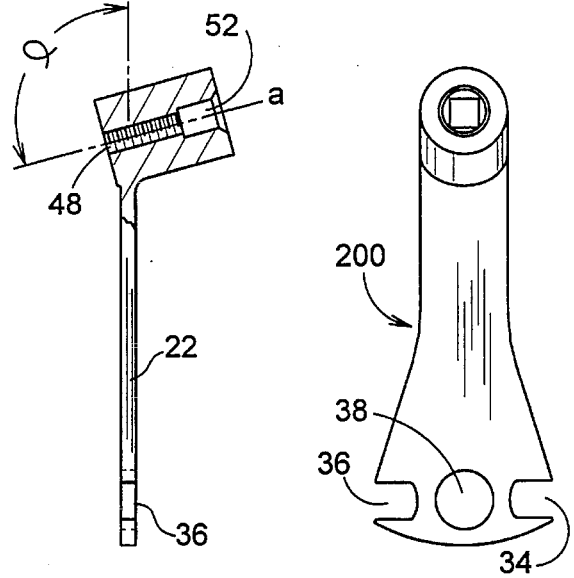
FIG. 3   FIG. 4   FIG. 9   FIG. 10
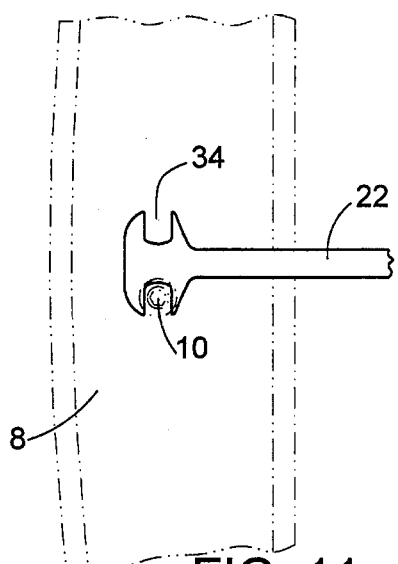 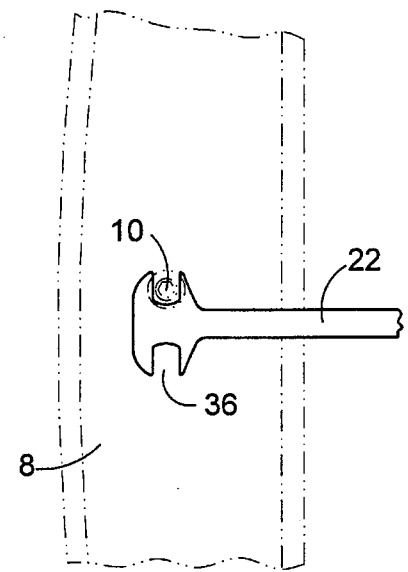
FIG. 11   FIG. 12

TOOL FOR USE IN ALIGNING A VEHICLE DOOR

BACKGROUND OF THE INVENTION (a) Field of the Invention

The present invention relates to a tool for use in aligning a vehicle door. The tool, when it engages a vehicle door lock apparatus on a vehicle door and a vehicle door lock engaging apparatus on a vehicle door frame, places the vehicle door and frame in a fixed, spaced apart relationship so that the tool user does not have to worry with the vehicle door moving toward or away from the frame when the door is being aligned. Therefore, the tool user is free to use both hands to operate the tool and does not have to use one hand to hold the vehicle door at a desired location with respect to the door frame.

(b) Description of the Prior Art

U.S. Pat. No. 4,399,683, Aug. 23, 1983, to Hunter, teaches a one-piece vehicle door aligning tool. The embodiment of FIG. 4 teaches a C-shaped arcuate recess 22 and the embodiment of FIG. 5 teaches opposed arcuate recesses 42, any of which can engage a lock pin 16. This tool, when placed in operation, as shown in FIGS. 1 or 3, will not place the vehicle door and frame in a fixed, spaced apart relationship so that the tool user does not have to worry with the vehicle door moving toward or away from the frame when the door is being aligned.

U.S. Pat. No. 4,744,135, May 17, 1988, to Roels, teaches an alignment adjustment tool for a vehicle door used with, for example, wrench 32. Rod member 16 for engaging wrench 32 and pin member 15 are taught as not axially aligned. As with Hunter, recess 13 will not place the vehicle door and frame in a fixed, spaced apart relationship so that the tool user does not have to worry with the vehicle door moving toward or away from the frame when the door is being aligned. The same is true of the strike pin engaging slot 3 of the autobody door aligning tool taught in U.S. Pat. No. 4,930,337, Jun. 5, 1990, to Schaap.

Applicant is also aware of a door hinge aligner, model DHA7554, manufactured by MAC Tools and a similar tool made by STECK. The MAC tool is a round leverage bar having a lock pin engaging slot at one end. The bar has a slidable lock engager thereon. The STECK tool is similar, except that the leverage bar is square to deter axial twisting of the bar. As with the other known prior art, neither tool will place the vehicle door and frame in a fixed, spaced apart relationship so that the tool user does not have to worry with the vehicle door moving toward or away from the frame when the door is being aligned.

SUMMARY OF THE INVENTION

The present invention is for a tool for use in aligning a vehicle door. A vehicle typically has a door lock assembly which receives a lock pin on the door frame, or similar article, to secure the vehicle door in a closed position. The tool of the present invention has a comparable lock pin toward one end which can be "locked" into the vehicle lock assembly and, at an opposed end, means for engaging the vehicle door frame lock pin. The lock pin engaging portion is structured so that, at least, the door and the door frame are horizontally fixed in a desired ajar relationship. This frees both hands of the tool user to make the desired door adjustment. The tool of the preferred embodiment is used with a standard breaker bar, with extension if necessary.

More particularly, the present invention comprises a tool for use in aligning a vehicle door, comprising: means for engaging a vehicle lock engaging apparatus, the vehicle lock engaging apparatus extending generally horizontally from a vehicle door frame; means for engaging a vehicle door lock apparatus; means for receiving a door adjusting tool; and, a separator bar, the separator bar having the means for engaging a vehicle lock engaging apparatus toward a first end, the separator bar having the means for engaging a vehicle door lock apparatus and means for receiving a door adjusting tool toward a second end, the first end and the second end having a preselected distance therebetween for spacing the door and the door frame in a desired ajar relationship; where, when the means for engaging a vehicle lock engaging apparatus is engaging a vehicle lock engaging apparatus and when the means for engaging a vehicle door lock apparatus is engaging a vehicle door lock apparatus, the vehicle door and the vehicle door frame are in a fixed relationship in at least a horizontal direction.

BRIEF DESCRIPTION OF THE DRAWINGS

A better understanding of the present invention will be had upon reference to the following description in conjunction with the accompanying drawings, wherein:

FIG. 1 shows a perspective view of a first embodiment of a tool for use in aligning a vehicle door, the tool not including the portion which engages the door lock;

FIG. 2 shows a perspective view of a second embodiment of a tool for use in aligning a vehicle door, the tool not including the portion which engages the door lock;

FIG. 3 shows a side view of the tool of FIG. 1, the tool having selected portions cut away;

FIG. 4 shows a front view of the tool of FIG. 1;

FIG. 5 shows an end view of a first door lock engaging apparatus which can be used with the tool of FIG. 1 or 2;

FIG. 6 shows a side view of the apparatus of FIG. 5;

FIG. 7 shows an end view of a second alternative door lock engaging apparatus which can be used with the tool of FIG. 1 or 2;

FIG. 8 shows a side view of the apparatus of FIG. 7;

FIG. 9 shows a side view of the tool of FIG. 2, the tool having selected portions cut away;

FIG. 10 shows a front view of the tool of FIG. 2;

FIG. 11 shows a portion of the tool of FIG. 1 engaging a vehicle lock engaging apparatus as it would be placed for adjusting the vehicle door upward;

FIG. 12 shows a portion of the tool of FIG. 1 engaging a vehicle lock engaging apparatus as it would be placed for adjusting the vehicle door downward;

DETAILED DESCRIPTION OF THE PREFERRED EMBODIMENT

Figure 13:
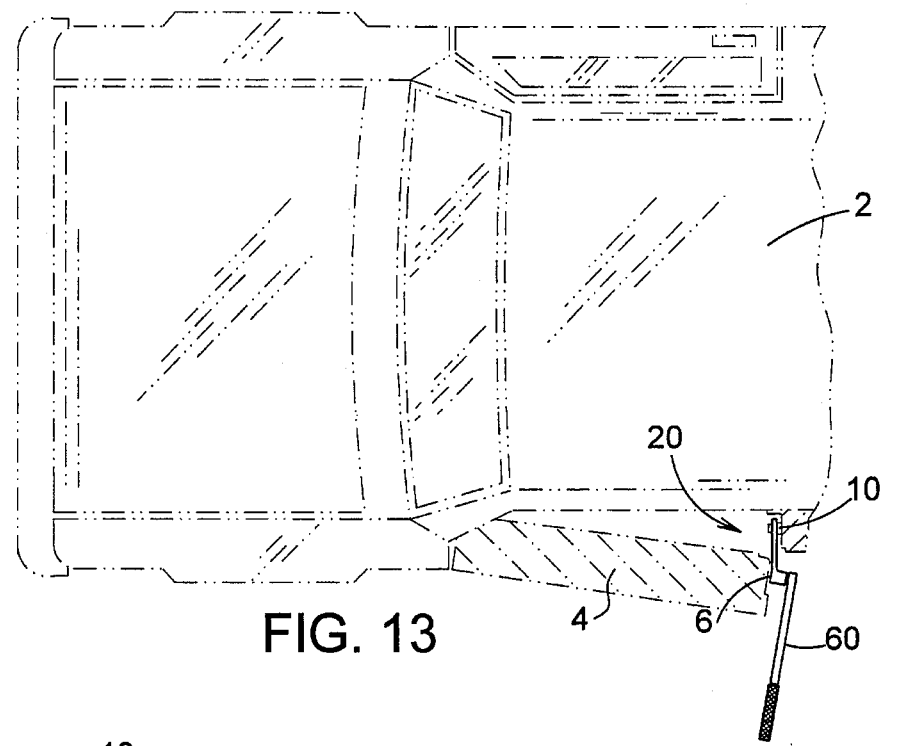
FIG. 13 shows how the tool of the instant invention would be placed to align the front left door of a vehicle.
Figure 14:
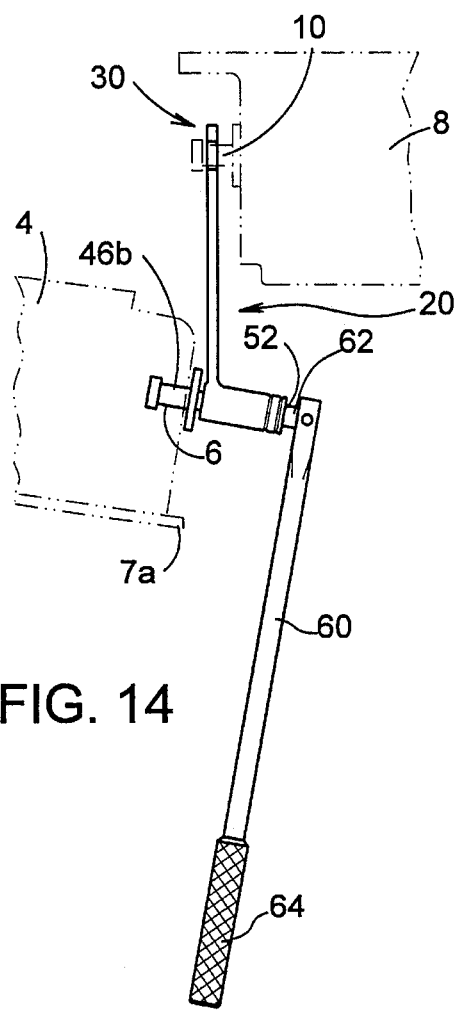
FIG. 14 shows how the tool of the instant invention would be used without an extension bar to adjust a door having a short exterior door lip, such as typically found in two door vehicles; and, FIG. 15 shows how the tool of the instant invention would be used with an extension bar to adjust a door having a long exterior door lip, such as typically found in the rear doors of four door vehicles.
Figure 15:
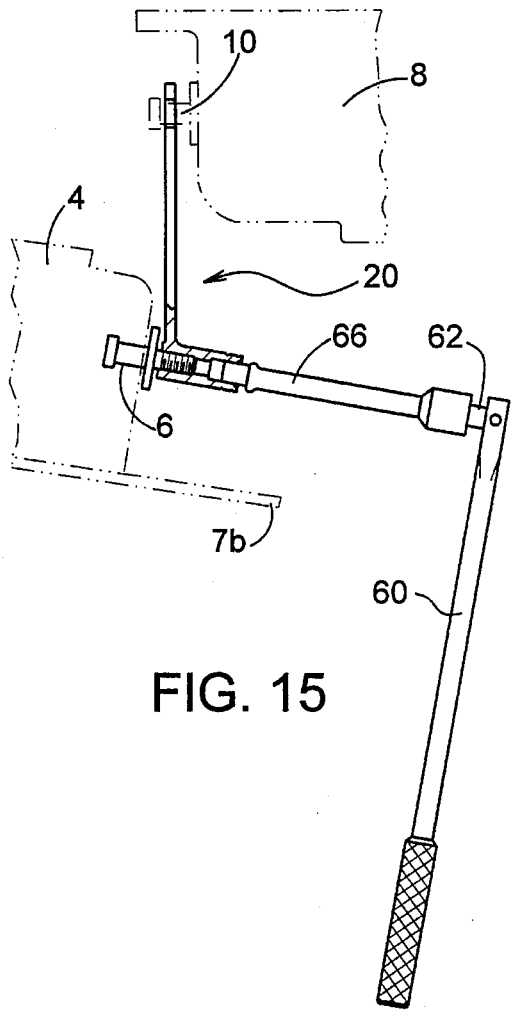

With reference to FIGS. 13–15, a vehicle 2 is shown having a front left door 4 having a vehicle door lock apparatus 6 therein. The door 4 is received within a frame 8 having a vehicle lock engaging apparatus 10 extending generally horizontally therefrom. Generally, apparatus 10 is a post or pin of desired diameter, for example, such as seen in FIGS. 5–8, or a U-shaped bolt having its two ends received within frame 8. As will be discussed in more detail later, the door 4 may have a short exterior door lip 7a, such as shown in FIG. 14, typically found in two door vehicles, or a long exterior door lip 7b, such as shown in FIG. 15, typically found in the rear doors of four door vehicles.

FIGS. 1, 3, and 4 show a first embodiment of the tool 20 of the instant invention, the tool not including the portion which engages the door lock, and FIGS. 2, 9, and 10 show a second embodiment 200 of the instant invention. FIGS. 5 and 6 and FIGS. 7 and 8 show a first 40a and a second 40b embodiment, respectively, of the portion which engages the door lock, either embodiment 40a or 40b useable with either tool embodiment 20 or 200.

With reference to FIGS. 1 and 3–8, the tool 20 is shown having a separator bar 22 having a first end 24 and a second end 26 having a preselected distance, identified by the letter "d", therebetween. It is preferred that this preselected distance be such that, when the tool is to be used, the vehicle door frame 8 and the vehicle door 4 will be in a fixed horizontal relationship with the door 4 ajar from the frame 8 about six inches.

Toward first end 24 of separator bar 22 is means 30 for engaging a vehicle lock engaging apparatus 10. In this embodiment, means 30 is shown as an enlarged head 32 having a pair of opposed wrench-like openings 34 and 36 therein. With additional reference to FIGS. 11 and 12, it is shown that, for this vehicle 2, the vehicle lock engaging apparatus 10 is a pin. Openings 34 and 36 have a preselected depth, for example about one-half inch, so that they fully receive the pin, this depth being greater than or equal to the pin diameter. This depth is essential to horizontally fix the door 4 and frame 8. Sample pins of two diameters are shown in FIGS. 5–8. As was previously mentioned, some vehicles employ U-shaped bolts. The tool 20 can be similarly used to engage one leg of the U-shaped bolt, which will have a diameter similar to the pins of Figures 5–8.

When the tool is in its operational position for adjusting a door 4, the first opening 34 will face vertically upward and the opposed second opening 36 will face vertically downward. As seen in FIGS. 11 and 12, first opening 34 is used for adjusting the door 4 downward and second opening 36 is used to adjust door 4 upward. The second embodiment 200 of FIGS. 2 and 9–10 is similar to the first embodiment 20, except that between opposed openings 34 and 36 is a throughbore 38, for example having a diameter of about an inch. When the vehicle lock engaging apparatus 10 is a pin, instead of using one of openings 34 or 36, bore 38 can be placed over the pin so that the tool 200 won't slip off the pin vertically. Other than that modification, tools 20 and 200 function identically.

With reference back to tool 20 of the first embodiment, toward the second end 26 of the separator bar 22 is means for engaging a vehicle door lock apparatus 6, shown in FIGS. 5 and 6 as means 40a and in FIGS. 7 and 8 as means 40b, and means 50 for receiving a door adjusting tool. Currently, vehicles typically have either a pin like means 40a or 40b. However, by making means for engaging a vehicle door lock apparatus 6 removably receivable by tool 20 (or tool 200), any diameter means, like 40a or 40b, can be selected as required for the vehicle 2 having its door 4 adjusted. Means 40a is shown having a threaded rod 42 which is receivable by threaded bore 48. Means 40a also has a collar 44 and a lock engaging pin 46a, having a first diameter. Means 40b is shown having a threaded rod 42 which is also receivable by threaded bore 48. Means 40b also has a collar 44 and a lock engaging pin 46b, having a second diameter, shown as being greater than the first diameter of means 40a.

Means 50 for receiving a door adjusting tool is shown as a square shaped opening 52. With further reference to FIGS. 14 and 15, the door adjusting tool is shown as breaker bar 60 having a-square pin 62 at one end and a handle 64 at an opposed end. This is a standard breaker bar which is contained with socket sets. If door adjusting tools are desired which have pins which are not of square shape are to be employed (for example, a hex driver), square shaped opening 52 will be shaped to mate with the desired shaped pin.

As is best seen in FIGS. 3, 9, and 15, threaded bore 48 and opening 52 have a common axis, identified in FIG. 9 by the letter "a". To facilitate proper engagement of means 30 with pin 10 and means 40a or 40b with lock apparatus 6, because door 4 will be ajar from frame 8, axis "a" is tilted at a preselected angle with respect to bar 22. In FIG. 9, the preselected angle is identified as alpha or "α". With "d" being a distance such that the door 4 is ajar from frame 8 by about six inches, the preselected angle a is preferably about 105 degrees, as shown.

With reference to FIGS. 11–15, operation of a tool 20, for example, is shown. If the door 4 to be adjusted has a "short" door exterior lip, such as, for example, lip 7a of FIG. 14, then, the breaker bar 60 can directly engage tool 20. Alternatively, if the door 4 to be adjusted has a "long" door exterior lip, such as, for example, lip 7b of FIG. 15, then, the breaker bar 60 can not directly engage tool 20, and, for example, an extension bar, such as extension bar 66 shown in FIG. 15, is employed between bar 60 and tool 20. To adjust a vehicle door, the desired diameter lock engaging pin, for example 40a or 40b, is threaded into bore 48. Depending on whether the door is to be adjusted up or down, the desired opening 36 or 34, respectively (or bore 38 if using tool 200), is then placed over pin 10. Selected means 40a or 40b is then secured into the vehicle lock 6, thereby horizontally fixing the door 4 and frame 8 in an ajar relationship. The breaker bar 60, with or without extension bar 66, can then engage receiving means 50. Handle 64 can then be pushed down or up, as desired, to adjust the door. The horizontally fixed relationship between door 4 and frame 8 permits the user to use both hands on the tool, if necessary, as the user does not have to use one hand to maintain the door and frame in the desired ajar relationship, which must be done with all known prior art devices.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A tool for use in aligning a vehicle door, comprising:
   a. means for engaging a vehicle lock engaging appartus, said vehicle lock engaging apparatus extending generally horizontally from a vehicle door frame;
   b. means for engaging a vehicle door lock apparatus, where said means for engaging a vehicle lock engaging apparatus comprises a pair of opposed wrench-like openings, a first opening facing vertically upward and a second opening facing vertically downward, said first opening for adjusting said door downward and said second opening for adjusting said door upward, said wrench-like openings having opposed parallel flat surfaces and an additional connecting surface and having a depth sufficient to fully receive said vehicle lock engaging apparatus within said respective wrench-like opening;

c. means for receiving a door adjusting tool; and, d. a separator bar, said separator bar having said means for engaging a vehicle lock engaging apparatus toward a first end, said separator bar having said means for engaging a vehicle door lock apparatus and said means for receiving a door adjusting tool toward a second end, said first end and said second end having a preselected distance therebetween for spacing said door and said door frame in a desired ajar relationship, e. where, when said means for engaging a vehicle lock engaging apparatus is engaging a vehicle lock engaging apparatus and when said means for engaging a vehicle door lock apparatus is engaging a vehicle door lock apparatus, said vehicle door and said vehicle door frame are in a fixed relationship in at least a horizontal direction.

2. The tool of claim 1, where said means for receiving a door adjusting tool and said means for engaging a vehicle door lock apparatus have a common axis.

3. The tool of claim 2, where said common axis is at a preselected angle in relation to said separator bar.

4. The tool of claim 1, where said means for engaging a vehicle door lock apparatus is removably received by said separator bar.

5. The tool of claim 1, where said means for engaging a vehicle lock engaging apparatus further includes a horizontal bore through said separator bar.

6. The tool of claim 1, further comprising a door adjusting tool, said door adjusting tool received by said means for receiving a door adjusting tool.

7. The tool of claim 1, further comprising a door adjusting tool and an extension bar, said extension bar having a first end received by said means for receiving a door adjusting tool and a second end receiving said door adjusting tool.

8. A tool for use in aligning a vehicle door, comprising:

a separator bar, said separator bar having a first end and a second end, said first end and said second end having a preselected distance therebetween, said preselected distance therebetween for spacing said door and an associated door frame in a desired ajar relationship; said first end having an enlarged head portion, said enlarged head portion having a pair of opposed wrench-like openings for selectively engaging a vehicle lock engaging apparatus extending generally horizontally from said associated door frame, a first of said pair of opposed wrench-like openings facing in a vertically upward direction and a second of said pair of opposed wrench-like openings facing in a vertically downward direction; said second end having a vehicle door lock engaging pin extending in a first preselected direction therefrom and a door adjusting tool receiving portion extending in a second preselected direction therefrom, said first preselected direction being a direction opposite to said second preselected direction, said vehicle door lock engaging pin and said door adjusting tool receiving portion having a common axis, said common axis and said separator bar having a preselected angle therebetween;

where, when either said first or said second opening is selectively engaging said vehicle lock engaging apparatus and when said vehicle door lock engaging pin is engaging a vehicle door lock apparatus, said vehicle door and said associated door frame are in a fixed relationship in at least a horizontal direction; and, where, said wrench-like openings have opposed parallel flat surfaces and an additional connecting surface and have a depth sufficient to fully receive said vehicle lock engaging apparatus within said respective wrench-like opening.

9. The tool of claim 8, where said preselected distance is a distance such that said desired ajar relationship of said door and said associated door frame is about six inches.

10. The tool of claim 9, where said preselected angle is about 105 degrees.

11. The tool of claim 8, where said vehicle door lock engaging pin is removably received by said second end.

12. The tool of claim 8, where said enlarged head portion further comprises a throughbore for selectively engaging said vehicle lock engaging apparatus, said throughbore having a preselected diameter and being located generally between said pair of opposed openings.

* * * * *